United States Patent [19]

Colvin et al.

[11] Patent Number: 5,471,524
[45] Date of Patent: Nov. 28, 1995

[54] TOLL CALL RESTRICTOR METHOD AND APPARATUS

[75] Inventors: Donald G. Colvin, 10312 - 62nd Place W., Mukilteo, Wash. 98275; Peter Reynolds, Everett, Wash.

[73] Assignee: Donald G. Colvin, Mukilteo, Wash.

[21] Appl. No.: 946,051

[22] Filed: Sep. 15, 1992

[51] Int. Cl.$^6$ ..................................................... H04M 1/66
[52] U.S. Cl. .......................... 379/200; 379/199; 379/188
[58] Field of Search ................................ 379/34, 35, 199, 379/188, 189, 184, 387, 397, 442, 200, 161

[56] References Cited

U.S. PATENT DOCUMENTS

| | | | |
|---|---|---|---|
| 3,499,121 | 3/1970 | McIntosh et al. | 379/184 |
| 3,920,936 | 11/1975 | Mogtadar | 179/18 |
| 4,188,508 | 2/1980 | Rogers et al. | 179/18 |
| 4,314,108 | 2/1982 | Sharvit | 179/90 |
| 4,358,640 | 11/1982 | Murray | 179/90 |
| 4,511,765 | 4/1985 | Kuo | 179/90 |
| 4,866,762 | 9/1989 | Pintar | 379/200 |
| 4,941,166 | 7/1990 | Waldman et al. | 379/67 |
| 4,953,202 | 8/1990 | Newell | 379/200 |
| 5,200,995 | 4/1993 | Gaukel et al. | 379/200 |

FOREIGN PATENT DOCUMENTS

| | | | |
|---|---|---|---|
| WO87376 | 1/1987 | United Kingdom | H04M 1/66 |

OTHER PUBLICATIONS

"Call Control", Hello Direct Catalog, 1991, pp. 38, 39.

*Primary Examiner*—Jeffery A. Hofsass
*Assistant Examiner*—Daniel S. Hunter
*Attorney, Agent, or Firm*—Seed and Berry

[57] ABSTRACT

An apparatus for restricting telephone calls. The apparatus is wall mountable and can be powered by power available from a telephone line equipping a facility. Visually, the device emulates the appearance of a standard in-wall telephone connector package, with the electrical components of the device concealed with the facility wall. A programmable processor is incorporated into the apparatus allowing the user to override restrictions, enter new restrictions, or change the security code through entry of digits from a standard tone or pulse dialing telephone. Use of linear logic protocol in programming reduces complexity of programming and probability of error. The device temporarily disconnects the telephone from the network as each programming sequence is completed, preventing a tie-up of the network and reducing the probability of an accidental establishment of a local or long-distance connection. A PLX option circuit isolates the telephone line connected to the restrictor outlet, preventing a user of the telephone from eavesdropping on calls made from another telephone on the same line.

17 Claims, 6 Drawing Sheets

TOLL CALL RESTRICTOR METHOD AND APPARATUS

TECHNICAL FIELD

The present invention relates to a device for controlling telephone dialing access and more particularly to a circuit mounted to a standard faceplate that is user programmable to restrict telephone dialing access.

BACKGROUND

Increased flexibility in telephone call services has expanded greatly the options available to telephone users. Many options are now available to allow users to call locations throughout the world, access special focus services, and customize personal telephone services.

Traditionally, costs of telephone service were limited to a fee for monthly usage and additional fees for long-distance calls. In such a system, the risk of additional costs due to unauthorized telephone usage was not significant.

Now, services provided through the telephone increased dramatically the cost problems associated with telephone usage and ownership. Expensive and sometimes objectionable services, information and purchasing programs are now readily available to anyone with a telephone.

For example, telephone services often charging several dollars per minute are accessible through most home telephones. An unauthorized user can utilize these services through another person's telephone, placing the liability on the owner. The situation becomes even more problematic when enticing advertisements touting these services induce children to call. The costs of these products and services may not be identified to the actual user of the telephone, but rather are directed toward the owner of the telephone.

Costs associated with the unauthorized use of telephones has thus become a significant risk consideration for any telephone owner. Considerable time and expense has been devoted to addressing this problem. The most prevalent and promising approach has been to limit in some way the calls that can made from one's telephones.

A typical situation involves a business operator who prohibits telephone use by customers. The risk of unauthorized costs is thus avoided at the cost of inconvenience to customers. Additionally, the operator may not always be present to prevent a customer or interloper from furtively incurring charges.

More elaborate schemes for avoiding additional costs include a centralized business telephone system through which all calls are routed. A complex computer control system requiring user authorization and billing codes is often included in relatively large office systems. Such a system is expensive and well beyond the reasonable scope of an individual telephone owner or small business operator.

In an attempt to reduce the cost and complexity of controlling access to telephone services and numbers, attempts have been made to develop devices to prevent undesirable telephone operation. Cost, complexity, limited flexibility, limited applicability and ease of circumvention have prevented these from significant success.

One device sold on the open market under the name TC-1013SL, Programmable Call Controller, by Tel Control, Inc., is available. This device is placed serially between the telephone wall outlet and the operative telephone. While this device provides an improvement over previous technologies, it suffers from many limitations.

The in-line TC-1013SL package is visually obvious, allowing even an unsophisticated user to circumvent the call restriction device. To prevent circumvention, a simple plastic cover containing slots through which the telephone cable connectors will not easily pass is placed on the device. To remove the call restrictor, a user need only force the package open or force the cables through the slots and connect the phone directly to the telephone line. The user can then place calls without restriction.

A further constraint of the device is the need for a complex multilevel protocol to program it. Programming by a user requires several levels of steps, each dependent upon the previous steps. The complexity of its operation limits its adaptability, increases the probability of errant programming, and intimidates the typical prospective purchaser.

A further problem arises from the complexity of programming inherent in previous devices. When a user picks up the telephone to make a call or begin programming, a connection is recognized by the local telephone company. A dial tone is transmitted by the local telephone network to the user's telephone and a timer is begun. Upon recognition of the first digit by the local telephone company, the dial tone is interrupted; but, the sensing of phone numbers dialed continues. As the device is programmed, the circuits at the phone company wait for a call to be placed. A predetermined time after the initiation of the original dial tone, a telephone company monitoring circuit judges that an unsuccessful attempt has been made to make a telephone call. Typically, an audible error message is then generated on the line telling the user to hang up and retry the call. Additionally, access to the local telephone network is discontinued.

Consequences of the excessive connect time can be significant. For example, a user may be led to believe that the attempt to program the device has been unsuccessful and may terminate the attempt. Additionally, while the timer is running, a portion of the local telephone network is dedicated to the call, occupying the limited available resources at the phone company. While this may not be significant in an individual case, the cumulative effect of many devices would place a substantial burden on the local network.

There also exists a possibility that the sequence of numbers entered by the user may be interpreted by the telephone network as a recognizable number. An unintended number is thus dialed and the line is connected to another customer during programming. The probability of this occurrence may be reduced by choosing a programming sequence that differs substantially from typical recognizable telephone codes. However, where the user inaccurately enters the programming numbers, an accidental connection may be established.

SUMMARY OF THE PRESENT INVENTION

The present invention addresses the problem of circumvention by secreting the device behind a common, commercially available wall connector. The presence of the inventive device is thus not obvious to even a relatively sophisticated user. The ordinary user places and receives calls without even being aware of the device's existence. If the user attempts to make an unauthorized call such as a long distance or 900 number, the phone line connection is cut off and the call prevented. Even if the invention's existence is known, access to and bypass of the device is extremely difficult and requiring removal of the wall plate.

The present invention overcomes the problems of a multiple telephone installation, by including a circuit that allows a single telephone in a facility to be isolated with a single device. A unique PLX circuit detects when an alternate telephone is in operation on the same line and thus prevents the user of the restricted telephone from making calls or eavesdropping.

The present invention overcomes the programming limitations of prior art multilevel protocol complexity by incorporating a linear protocol. Normal programming requires no special steps to be taken. When some special function such as erasing memory, changing the access code or accessing restricted calls is desired, the programmer enables access by simply entering a lead control code followed by an access code. The programmer is then permitted to dial a restricted number, or choose one of the programming functions.

The present invention overcomes the problem of excessive programming and connect times by interrupting the telephone line connection for a short period of time as each step in the programming or dialing procedure is complete. Immediately after each step, a phone line connection is reestablished. This provides to the programmer an audible prompt to indicate successful completion of the step.

The programming protocol also prevents an improper error signal or wrong number from being dialed through the local telephone company. Moreover, it terminates connection to the network momentarily on a regular basis, allowing more efficient use of the network. The inventive programming protocol also overcomes the possibility of an accidental connection by limiting the maximum number of programming digits between disconnects to less than that required to place a call. Consequently, most programming sequences which could be recognized as a call will be interrupted before completion, eliminating the problem.

DETAILED DESCRIPTION OF THE INVENTION

Figure 1:
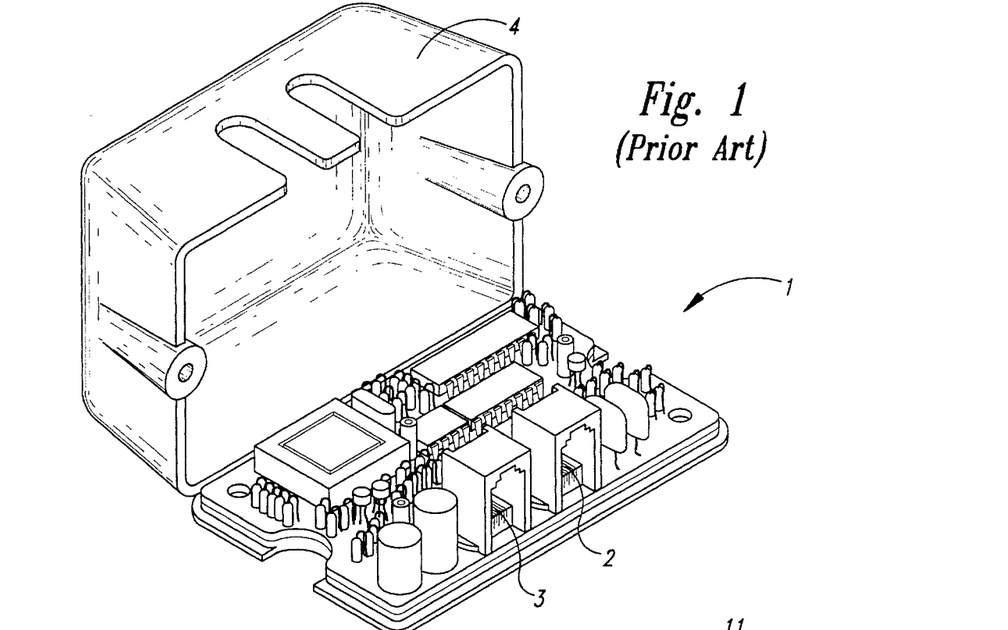
FIG. 1 is a top plan view of a prior art device.

FIG. 1 illustrates a phone dialing controller of the prior art. The controller 1 includes a phone input jack 2 and a phone output jack 3. The line from the telephone is plugged into the input jack 2 and a line from the controller to the telephone office line is plugged into output jack 3. The cover 4 may be closed to make removal of the lines more difficult.

The prior art of FIG. 1 is that previously discussed as the TC-1013SL having several disadvantages. First, a user is aware that telephone calls are routed through the controller. The caller may bypass the controller by plugging the phone line directly into the wall plug. Other disadvantages as previously described are apparent from the literature describing its use.

Figures 2A, 2B, 2C:
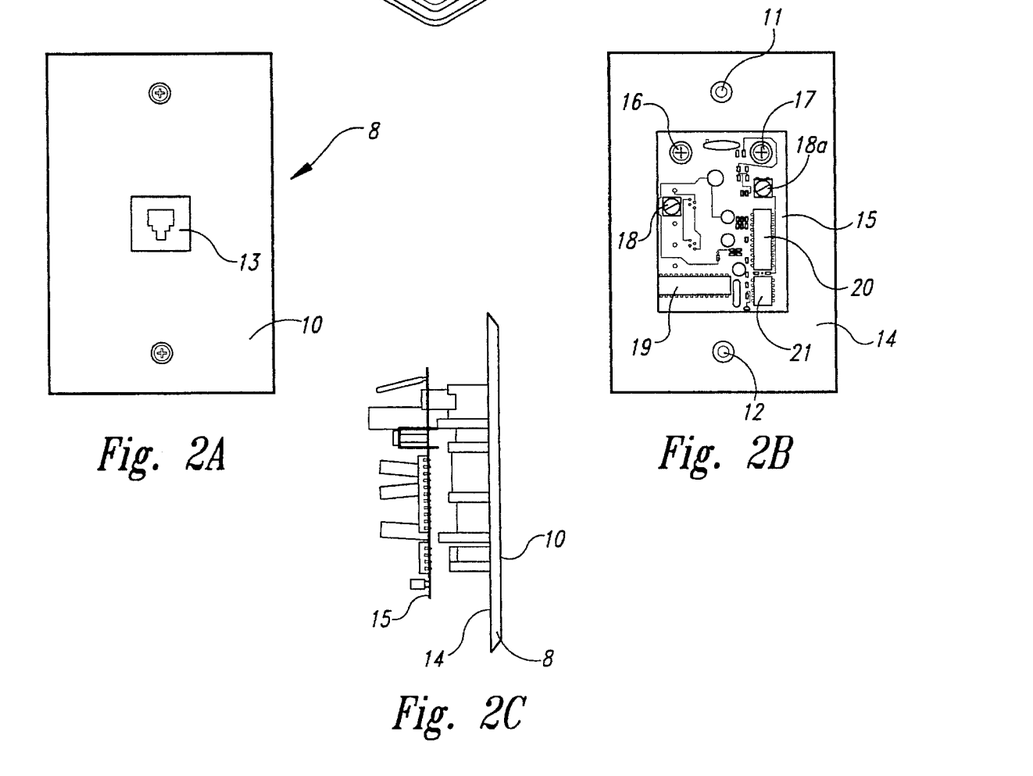
FIG. 2A is a front plan view of the inventive device.
FIG. 2B is a rear plan view of one embodiment of the inventive device.
FIG. 2C is a side elevational view of the of the embodiment of FIG. 2B.

FIGS. 2A, 2B and 2C illustrate the inventive controller mounted on a wall plate 8. The wall plate 8 has a front surface 10 visually similar to a common, commercially available telephone wall plate. Apertures 11 and 12 are mounting holes allowing the wall mountable plate to be attached to a standard wall outlet. Connector 13 is a typical standard telephone cable connector jack receptacle mounted in the wall plate 8 and includes a pair of connector terminals. Manufacture of such plates is performed readily by those of ordinary skill in the art.

Coupled to the rear surface 14 of the wall mountable plate 8 is a printed circuit board 15 having a footprint smaller than the wall mountable plate 8. Telephone line input terminals 16 and 17 are coupled electrically to printed circuit board 15 and to the connector jack 13 to provide means for connection of the jack receptacle connector terminals to the printed circuit board 15. Telephone line input terminals 16 and 17 also mechanically couple printed circuit board 15 to wall plate 8. A pair of central office telephone line input terminals 18 and 18A are coupled electrically to the printed circuit board 15 and provide means for electrical connection of the inventive device to a telephone line from the central telephone office.

Attached to printed circuit board 15 is a telephone dialing control circuit. The telephone dialing control circuit includes a microprocessor 19, a dual tone multiple frequency (DTMF) signal decoder 20 and a memory 21. The device also includes appropriate resistors, transistors, capacitors and other circuit elements to form an operational circuit. A more complete description of the components, their functions and interconnections is given in the discussion of the electrical circuit schematic of FIG. 3.

A summary of some of the key features of the device is useful in understanding the object of the invention and detailed circuit description as provided herein. One embodiment of the device incorporates a microprocessor to make intelligent decisions on which calls to allow and which to restrict. To allow the user to program a user-selected security code and for the user to program selected allowed phone numbers (APNs) the embodiment includes an EEPROM memory chip. The device decodes and responds to pulse (rotary) dialed digits as well as DTMF dialed digits.

While a more complete description of the device is given later, a block functional description of the preferred embodiment of the device is instructive.

A controlled telephone line is placed in series with the device via the connections to the board. The lifting of the receiver on the telephone draws current through the device, giving it the power to operate. Also in series with the phone line is the device's power control transistor. When the device first powers up, the DTMF decoder chip monitors the telephone line to decode any digit which is dialed. The microprocessor monitors the DTMF decoder outputs and the current flow through the device. If a DTMF digit is dialed, the microprocessor reads the DTMF decoder chip and determines what digit was dialed. If a pulse (rotary) dialed digit occurs, the microprocessor detects what digit was dialed by monitoring and counting the current pulses in the telephone line. To prevent a false detection of a pulse digit, the device monitors the duration of the received pulse. If the received pulse is not of a specified duration, The received pulse is determined to be an error and is not acceptable.

If the first digit dialed is not a 1 or a 0, then:

The microprocessor counts the number of digits dialed and does not allow a call with more than a prescribed number of digits dialed. This restriction can prevent the dialing of a toll call in areas where an area code is not necessarily preceded by a 1 for some toll calls.

If the first digit dialed is a 0, then:

The call is cut off immediately to prevent operator dialed toll calls from being placed.

If the first digit dialed is a 1, then:

The successive digits are monitored. As each new digit is dialed, the string of digits dialed is compared with the list of numbers in the APN (allowed phone number) memory. If, at any digit, a complete APN match is found, then the call is allowed to go through. In this case, the microcontroller simply waits for the user to hang up. If, at any digit, the microcontroller determines that there is no possible remaining entry in the APN memory which could match the currently dialed digit string, then the call is restricted. The restriction remains in effect until the telephone is hung up and left hung up for a few seconds. While comparing the dialed digit string to the APN memory, the microprocessor is also comparing the dialed digit string to 1-800, and if this match is found, the call is allowed. Also, while comparing the dialed digit string to the APN memory, the microprocessor also compares the dialed digit string to the user programmed security code.

If a match is found with the security code, then:

The telephone is momentarily disconnected from the phone line and then reconnected. This causes the telephone company central office to give a new dial tone. The user may then enter one of several programming commands:

| | |
|---|---|
| 1 or 0 | allows any toll call to be placed |
| 2 | clears the memory of APNS, success tone, disconnect, new dial tone |
| 3 | disconnect, new dial tone, enter new (added) APN, success tone, disconnect, new dial tone |
| 4 | disconnect, new dial tone, enter new security code, success tone, disconnect, new dial tone |
| 5 | turn off all restrictions, success tone, disconnect, new dial tone |
| 6 | turn on all restrictions, success tone, disconnect, new dial tone |
| 7, 8, 9, *, # | error tone, disconnect, new dial tone |

To accomplish a disconnect:

The microprocessor holds off the base drive current to the power control transistors. While the power is off, the current through the telephone line is reduced to near zero and the telephone company central office will consider the phone hung up. This condition remains, with the microprocessor power coming from a storage capacitor, until a voltage controlled by an RC time constant on the $\overline{IRQ}$ line goes low. This triggers the microprocessor $\overline{IRQ}$ service routine which tells the processor that the disconnect is complete. The microprocessor then restores base drive current to the power control transistor and the microprocessor continues with the proper mode of operation depending on what conditions existed when the disconnect was begun.

To accomplish a restriction:

The microprocessor begins by doing a disconnect (described above). Upon continuing after the disconnect, the restrict flag is found set and another disconnect is begun within a few microseconds of leaving the disconnect. This is virtually a continuous disconnect. This condition will prevail until the telephone is hung up. Because the phone is hung up, all power to the device is cut off and the whole system will be powered down. When the telephone is again taken off hook, the device will begin again from a fresh power-up.

Figure 3:
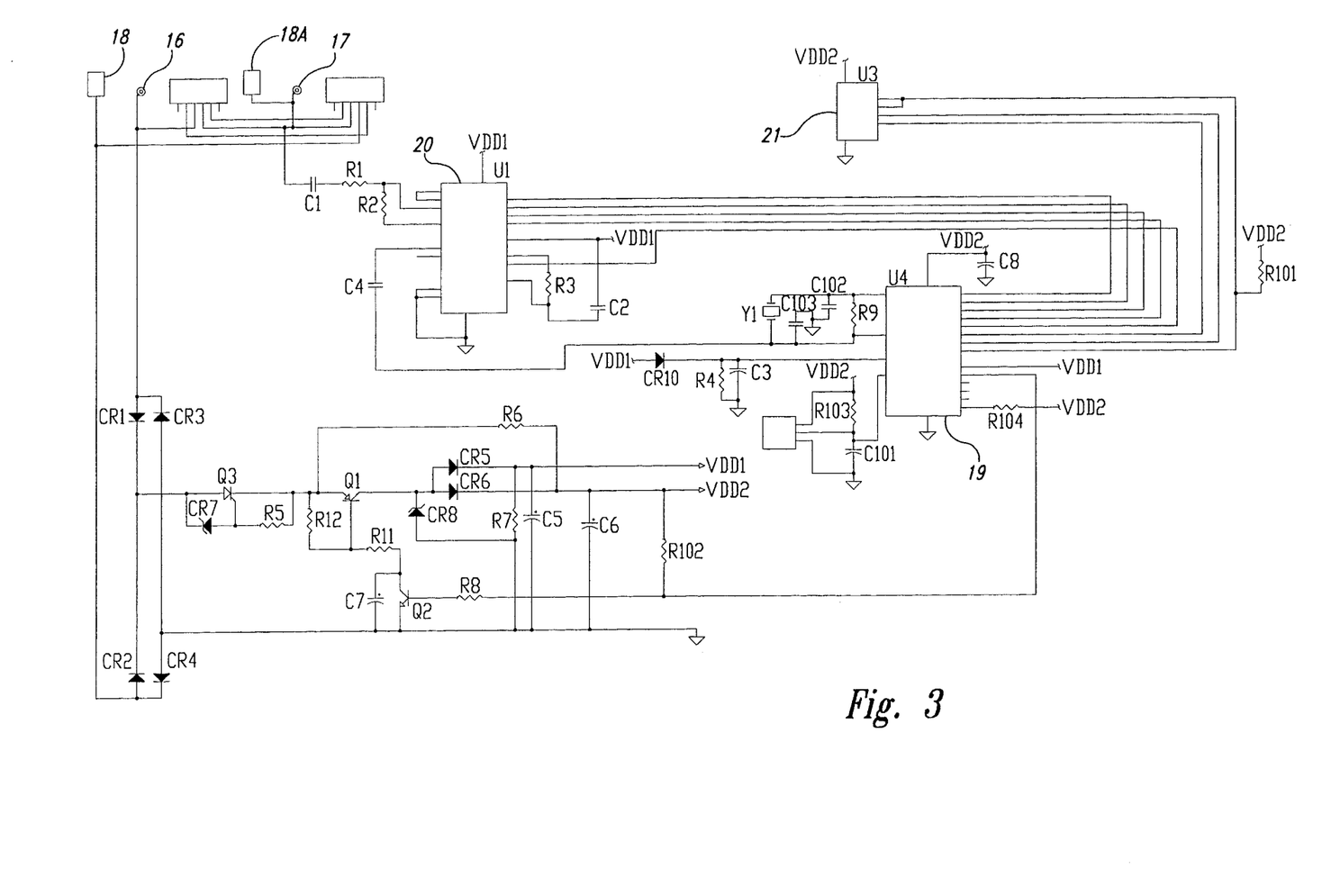
FIG. 3 is a circuit schematic of a preferred embodiment of the invention.

FIG. 3 is a circuit schematic of the inventive dialing control circuit shown in FIGS. 2A–2C. Central office telephone line input terminals J1 and J2 correspond to central office telephone line input terminals 18 and 18A of FIG. 2B. Local telephone line input terminals E1 and E2 correspond to telephone line input terminals 16 and 17 of FIG. 2B. Electrical signals from the telephone company are input to central telephone line input terminals J1 and J2. The signal from central office telephone line input terminal J2 is input to the diode bridge constituted by diodes CR1, CR2, CR3, and CR4 at the interconnection between the opposing anode and cathode of diodes CR2 and CR4. Central telephone input terminal J1 is electrically connected to telephone line input terminal E1 and is also capacitively coupled to the DTMF decoder input resistors R1 and R2 through coupling capacitor C1.

FIG. 3 also shows two optional RJ11 standard telephone line connectors J3 and J4 in the circuit. Inclusion of optional connectors J3 and J4 in the circuit would allow use of the package in a configuration not concealed within a wall. In a device including the optional connectors, optional connector input from the central telephone office line is input to optional connector J3 and a telephone is connected to optional connector J4.

In operation of the preferred embodiment of the device, a telephone is connected to telephone line input terminals E1 and E2 via the standard jack connector 13 described earlier. When the telephone is picked up, current is routed through the telephone and the signal from telephone line input terminal E2 reaches telephone line input terminal E1 through the dialing control circuit. Telephone line input terminal E2 is input to the diode bridge constituted by diodes CR1, CR2, CR3, and CR4 at the interconnection between the opposing anode and cathode of diodes CR1 and CR3.

Diodes CR1, CR2, CR3, and CR4 are arranged in a bridge to isolate the device from polarity sensitivity. The connection between opposing diode pair CR3 and CR4 is connected electrically to package ground. The connection between opposing diode pair CR1 and CR2 is output to silicon controlled rectifier Q3 and zener diode CR7.

Zener diode CR7, silicon controlled rectifier Q3, and resistor R5 constitute an isolation circuit referred to herein as a PLX option circuit which operates as a telephone isolation circuit to isolate the telephone connected to the inventive dialing control circuit from other telephone outlets on the same two-wire central office phone line. As is well known, two or more local phones can be connected to the same central office telephone line, usually at different outlets in the home or business. When a different telephone attached to the same telephone line is in use, the PLX option circuit detects a reduced line voltage on the line. If the telephone having the inventive control device is picked up, it is not connected to the central office phone line. The user is thus prevented from eavesdropping on another phone connected to the same central office line.

In an alternative embodiment of the invention, the PLX option circuit may be eliminated. A connection is made directly between the output connection between diodes CR1 and CR2 and the power control disconnect circuit. The electrical characteristics of this alternative embodiment differ from the electrical characteristics of the embodiment of FIG. 4 because the device of the alternative embodiment will not prevent access to a telephone connected to the device when another telephone connected to the telephone line is off the hook.

The PLX option circuit is connected to the power disconnect circuit. The power disconnect circuit is comprised of transistor Q1, transistor Q2, resistor R12, resistor R11, resistor R8, resistor R102, and capacitor C7. A base current applied at the electrical connection between R8 and R102 will turn transistor Q2 on, pulling a current through resistors R11 and R12. This will turn on supply transistor Q1, enabling a throughput current to VDD1 and VDD2. The output voltage of the power control disconnect circuit is regulated by zener diode CR8, which is connected electrically between the collector of transistor Q1 and package ground.

Output from the power control disconnect circuit is input into isolating diodes CR5 and CR6. Output from diode CR5 provides a voltage VDD1 and output from isolating diode CR6 provides an output voltage VDD2. Bypass resistor R6 allows the circuit to be stabilized in its standby position by providing a current bleed to VDD2. This provides a small current to microprocessor 19 when the device is in a waiting or disconnect mode, as will be discussed later.

Capacitor C6 is connected between VDD2 and ground. The capacitor C6 stores a charge to momentarily sustain the value of the voltage VDD2 even though the current output of transistor Q1 is discontinued. Voltage at VDD2 prior to a discontinuance of current output from transistor Q1 is thus held for a sustained period of time by the capacitor C6. Resistor R102 is not connected between VDD2 and package ground to form a discharge network, rather resistor R102 is connected between VDD2 and the input to transistor Q1 through R8, Q2 and R11.

Resistor R7 and capacitor C5 are connected between the output of isolating diode CR5 and package ground. Capacitor C5 sustains only temporarily voltage VDD1 after transistor Q1 is temporarily shut down.

Resistor R7 is a low-value current bleed resistor allowing discharge of capacitor C5. The time constant of the circuit of resistor R7 and capacitor C5 is short relative to the time during which capacitor C6 maintains voltage VDD2, and relative to the period of a dial pulse when the device is used in connection with pulse dialing.

The AC signal component of the telephone input to central telephone input terminal passes through capacitor C1, while the DC component is blocked. Resistor R1 and resistor R2 transmit the AC signal from capacitor C1 to the IN- and GS inputs of DTMF decoder 20. DTMF decoder 20 converts the AC signal to a binary coded decimal (BCD) version. The BCD version of the signal is transmitted from outputs Q1, Q2, Q3, and Q4 of DTMF decoder 20 to inputs PA0, PA1, PA2, and PA3 of microprocessor 19. The microprocessor 19 analyzes the inputs and uses them, or in a pulse dialing system, analyzes and uses pulse inputs to program itself, store data, disconnect the phone line, permit authorized use, or the like, as explained in more detail herein.

Pins DD and DI, SK, and CS of memory 21 are electrically connected to pins PA5, PA6 and PA7, respectively, of microprocessor 19. This permits data, phone numbers, etc., to be stored in or retrieved from the memory 21.

Microprocessor 19 controls the connection or disconnection of the central office telephone lines to the local telephone lines by controlling the output of pin PB1. If microprocessor 19 holds output PB1 high, it holds the power disconnect circuit input between resistors R8 and R102 high. This leaves the power control disconnect circuit in an "on" mode, allowing signals to pass through the circuit from the local telephone lines to the central office telephone lines. If microprocessor 19 pulls the voltage output of pin PB1 down, the connection between resistor R8 and resistor R102 goes down, disabling the base current to transistor Q2 and consequently disabling transistor Q1 and opening the circuit connection between the central office telephone lines and local telephone lines. The open circuit is sensed by the central office as a telephone being hung up. The dial tone is cut-off and the central office is disconnected from the local phone line. Even though the local phone is still off the hook and use is being attempted, the power disconnect circuit has opened the circuit connection and effectively hung up the phone, as sensed by the central office and removed power from the telephone instrument. The user can thus be prevented from placing unauthorized phone calls.

Even though the power is cut-off by an open circuit with the central office phone lines, the inventive circuit permits the microprocessor 19 to continue to be powered for a selected period of time, as will now be explained. The supply current to diodes CR5 and CR6 is cut, consequently removing the central office telephone line as a current supply to VDD1 and VDD2.

After the central office telephone line supply current is cut-off, VDD1 remains high for only a short period of time as dictated by the RC pair of resistor R7 and capacitor C5. Power to the DTMF decoder 20 is cut-off almost immediately because it is powered from VDD1. A second level of protection against unpermitted dialing access is thereby achieved in addition to the cut-off of power to the telephone instrument by the power control disconnect circuit. If a user attempts to dial another number, the DTMF decoder 20 will not decode any tone and will not output a signal to the microprocessor 19. This prevents unwanted current drain and interference with the microprocessor 19.

Voltage VDD2 is held high for a longer period of time by capacitor C6 which will discharge slowly, with stored charge from the capacitor being consumed only as power is used by the microprocessor 19. The microprocessor 19 is supplied the trickle current through resistor R6 and capacitor C6 which are selected to ensure the microprocessor 19 has sufficient operational power even when the user and the central office both believe the phone line is hung up and disconnected from the central office telephone line. During the disconnect time period, the microprocessor is in a low-power mode, drawing only a few microamps, and capacitor C6 remains charged by current through resistor R6. Because the microprocessor is, in effect, in series with resistor R6, the central office line and the telephone instrument R6 appears to the central office line and to the telephone instrument as a much larger than actual value. The telephone is thus seen as disconnected and remains so until the output of microprocessor 19 changes.

The device establishes a reconnection by resetting the output of pin PB1 to high. A reset timing circuit consisting of isolating diode CR19, resistor R4 and capacitor C3 controls the reset time signal. The reset timing circuit is connected between supply diode CR5 and input $\overline{IRQ}$ of microprocessor 19. When VDD1 drops off quickly upon a disconnect, the voltage at $\overline{IRQ}$ is held high temporarily by capacitor C3. Gradually, capacitor C3 discharges through resistor R4 allowing the voltage to drop. When $\overline{IRQ}$ goes low, the microprocessor 19 sees this as a signal to check the status of the internal program.

The component values for the reset timing circuit are selected to provide a desired reset time. The reset time must be longer than the central office monitoring time to determine that a telephone is hung up. As is well known in the art, the central office telephone switch system may recognize a signal known in the art as a flash signal. This is a very brief, momentary disconnection of the line. The flash signal must be quite brief, generally in the range of 100–600 milliseconds. The flash signal is used in circumstances such as call-waiting, third party calling and other situations when it is desired to temporarily disconnect the line but reconnect the local telephone to the same central office phone line at a later time. The time of the reset timing circuit is selected to be sufficiently longer than the flash time of the central office phone system to ensure that the disconnection is seen as a hang up of the telephone and not as a short click, as may occur in a flash time signal. A reset time in the range of 1.5 seconds has been found acceptable for use as the reset time. That is, after the microprocessor 19 automatically disconnects the local telephone from the central office telephone lines, the reset timing circuit ensures that the local telephone will remain disconnected for at least the reset time, usually in the range of 1.5 seconds or longer. This ensures that the central office perceives that the telephone has been hung up.

After the reset time has elapsed and the input to pin $\overline{IRQ}$ goes low, the microprocessor 19 switches the output of PB1 to high, enabling a reconnection between the local telephone lines and the central office telephone lines by turning transistors Q2 and Q1 back on and permitting a current flow through diode CR5 and CR6.

The action to be taken shortly after the reconnection of the local telephone to the central office telephone line depends upon the status of the circuit operation. If the microprocessor 19 has recognized that the user is attempting to make an unauthorized call, the software code returns to a point in which the output of PB1 of microprocessor 19 is brought low again very quickly. This will break the connection between the local telephone and the central office telephone lines. The central office telephone line remains connected only for a very brief period of time, sufficiently long to provide a current surge to recharge capacitors C3, C5 and C6 to ensure maintaining of power to microprocessor 19. The connection does not remain established sufficiently long that a dial tone is provided to the local telephone user. Thus, so far as the local unauthorized user is concerned, the telephone line is never reconnected and the phone line remains dead.

If, on the other hand, the state of the microprocessor 19 is that it is being programmed or dialed by an authorized user, reconnection between the local telephone and the central office telephone line occurs. The output of PB1 remains high, maintaining a connection to the central office telephone lines and providing a dial tone to the authorized user. The authorized user hears the dial tone and recognizes this as a signal that he may dial the desired number, or alternatively continue the programming of the microprocessor 19 or storing data in memory 21.

Crystal Y1, capacitors C102 and C103 comprise the clock supply circuit. The clock supply circuit is connected between the oscillator connections of microprocessor 19 and generates the clock signal for the device. The output of the clock supply circuit is transmitted capacitively through capacitor C4 to DTMF decoder 20.

Undervoltage reset device UV1 forwards a reset voltage to processor U4 when the output voltage from isolation diode CR6 is below an acceptable level. Undervoltage reset device UV1 is a commercially available voltage sensor. The undervoltage reset circuit is provided to ensure that the voltage VDD provided to microprocessor 19 at no time drops below the minimum operating value for the specification of the microprocessor 19. According to the preferred operation, the current provided from the central office lines while the local telephone is off the hook should always be sufficient to maintain VDD2 at an operating voltage level for the microprocessor 19. However, in the event of unforeseen circumstances, such as a high-power consumption surge or other possible occurrences, the undervoltage reset circuit is provided to ensure that the microprocessor 19 is always operational. An input to the undervoltage reset circuit is VDD2. If VDD2 goes below a selected threshold level, then the undervoltage reset circuit pulls the input to $\overline{RST}$ low. When the input pin $\overline{RST}$ goes low, this is recognized as a master interrupt, reset signal by the microprocessor 19. The microprocessor 19 will then automatically pull pin PB1 high, thus turning on transistors Q1 and Q2 and reestablishing full power from the central office telephone line. The voltage at which VDD2 triggers the automatic reset is selected to be sufficiently high that the VDD input to the microprocessor 19 is at a value that permits operation of the microprocessor 19. This may be selected at some specification value of the microprocessor 19, such as 3.5 volts or the like.

Figure 4:
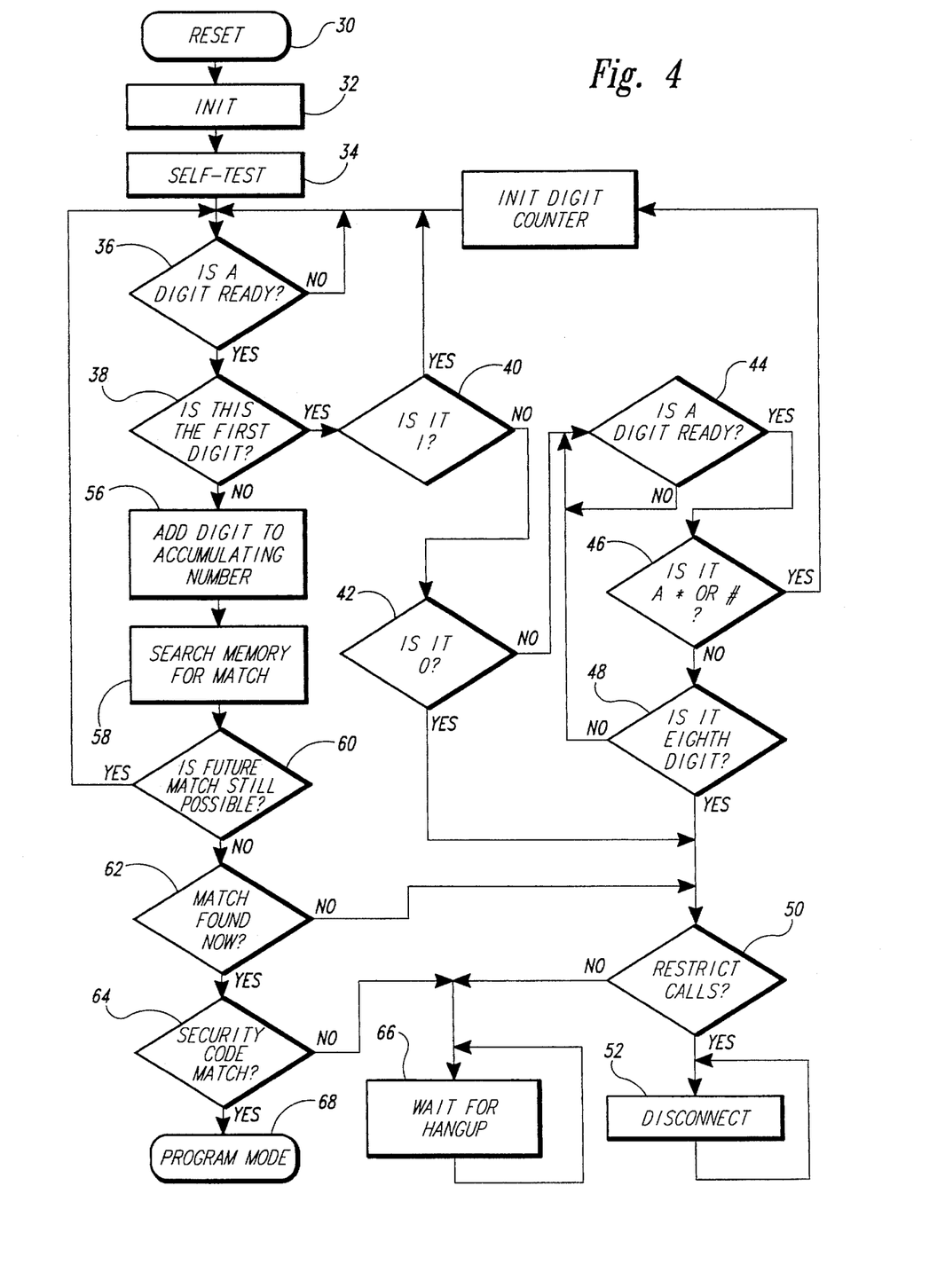
FIG. 4 is a flowchart describing the dialing logic of the device.

FIG. 4 presents a flow chart outlining the operation of the preferred embodiment of the invention. Operation of the device begins when the user picks up the telephone. The device resets all of the parameters to their initial values as shown in block 30. The device then performs an initialization and a self-test to determine if it is ready to begin operation, as shown in blocks 32, 34.

At this point the device is in a waiting mode, where it monitors the line to determine whether a digit has been received, as shown by block 36. If no digit is received, the device remains in a waiting mode. When a digit is received, the device determines if it is the first digit, as shown by block 38.

Upon entry of the first digit, the device determines whether or not the first digit is a 1, as shown by block 40. If the first digit is a 1, the device returns to the wait mode of block 36. If the digit is not a 1, the device determines whether or not the digit is a zero, as shown by block 42.

If the device determines that the digit is not a 1 or 0, the device is placed in wait mode, as shown by block 44. When a digit becomes ready, the device determines whether or not the digit is a # or *, block 46. If the device determines that the number is a # or *, it resets the digital counter and returns to the beginning of the process of block 36. This enables the user to restart the sequence by reentering the sequence from the beginning.

If the number is not a # or *, the device allows entry of the number, and dialing continues. If the number of digits entered exceeds 7, block 48, meaning the user has attempted to dial a long-distance number, the device then will restrict calls if the restrict function has not been disabled, as shown by block 50. If the restrict function has not been disabled, the telephone is disconnected and remains so until the unauthorized user hangs up, as shown by block 52.

If the first digit was a 1 in block 40, the device enters a programming segment to determine if the call being placed is permissible. The device returns to the wait mode of block 36, and upon entry of a second digit, the second digit is added to an accumulating number as shown by block 56. The device then searches its memory to determine whether the accumulating number matches a stored number as shown by block 58. If there is no match, the device determines whether a future match is possible as shown by block 60. If no future match to the stored sequence is possible, the device looks for a termination character in the stored sequence and, if a termination character is present, checks again for a match as represented by block 62. If no match is possible even with the termination character, an attempt is being made to place a toll call which is not an allowed call and the device restricts calls unless the restrictor as shown by block 50 is disabled. The local phone is disconnected by pin PB1 going low on the microprocessor 19, as previously described. If this is an unauthorized user, the software enters a loop in block 52 to keep the local phone disconnected all the time.

If a future match is possible in block 60, the device returns to block 36 to wait for another digit. If in block 62 the device finds a match between the entered number and a stored number with the termination character, the device determines whether the entered number is the security code, as shown by block 64. If the number is not the security code, the call has been completed and the device is placed in wait mode until the telephone is hung up, as shown by block 66. If the number that has been entered matches the security code number, the device is placed in program mode, as shown by block 68.

Figure 5:
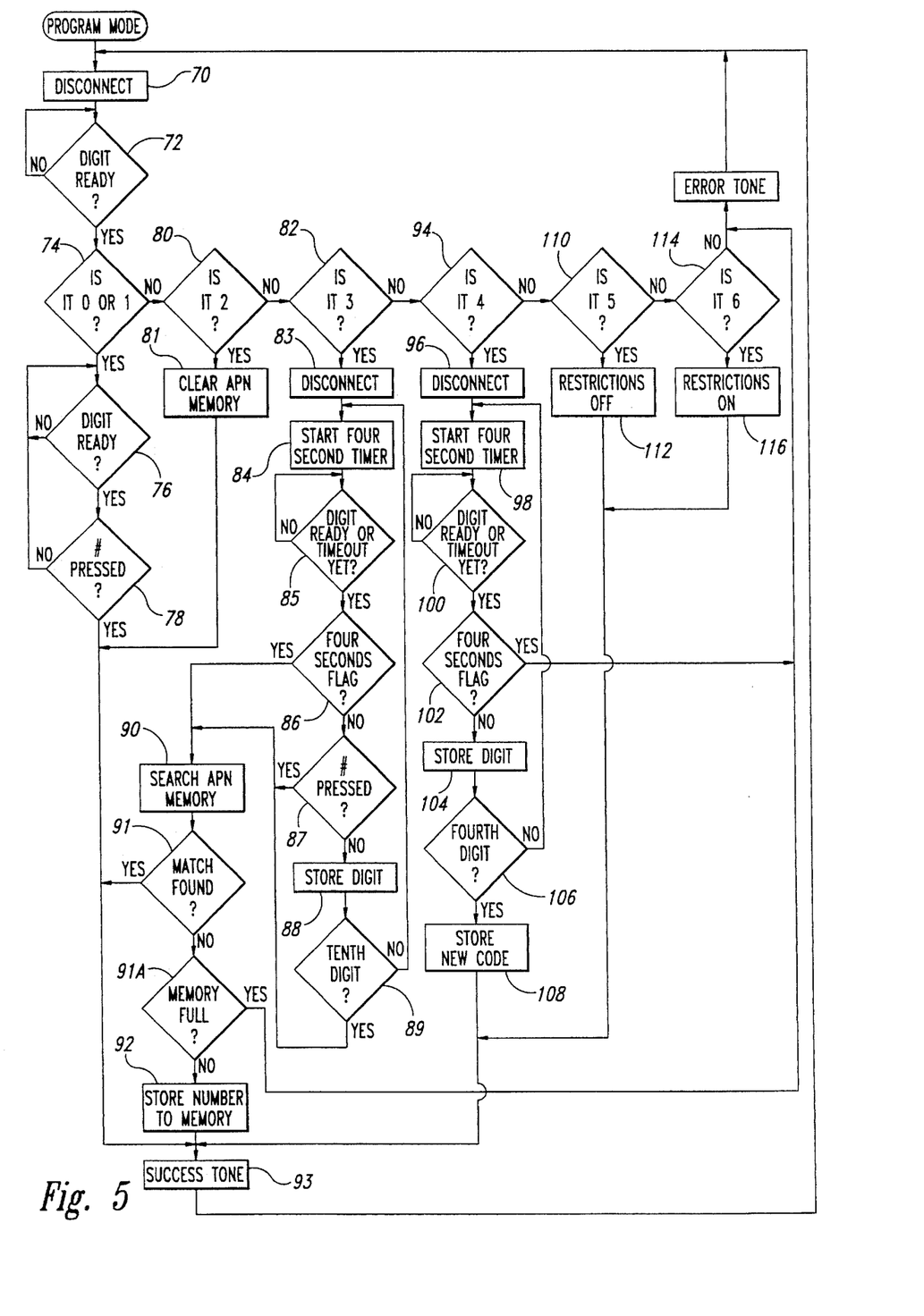
FIG. 5 is a flowchart describing the programming logic of the device.

After the user has entered a security code and a match is found, the circuit is placed in the toll call permitted mode, or alternatively, the programming mode. The operation of the device once a programming mode has been reached is shown in FIG. 5. Upon achieving program mode or toll call permitted state, the device temporarily disconnects the telephone and reestablishes a telephone link, as shown by block 70. This releases the telephone line to the network and reestablishes the link. As previously described in the hardware circuit description of FIG. 3, the telephone dialing control circuit includes an automatic reset timer circuit providing an input to pin $\overline{IRQ}$. During the programming mode as shown in FIG. 5, whenever a disconnect occurs, the time that the disconnect is effective is controlled by the reset timing circuit previously described. That is, the disconnect is maintained sufficiently long that the communication with the central office is broken and the central office recognizes the phone line as being hung up. As also previously described, after the reset time has passed, the circuit is automatically reconnected to the central office phone line, a dial tone is once again obtained. The device is then placed in wait mode until a digit is ready, as shown by block 72.

If the first digit dialed is a 1 or a 0, the system allows any toll call to be placed. Following the dialing of the 1 or the 0, the remainder of the toll call number is dialed and the user permitted to call the desired party. If the first number entered is a 2, this will clear all memory in the phone number memory 21. If the first number entered is a 3, this will permit the user to add new telephone numbers to the phone memory 21. If the first number entered is a 4, this permits the user to enter a new security code. If the first number dialed is a 5, this permits the user to turn off all restrictions for the system. All restrictions will remain off until turned back on. The restrictions may be turned back on by entering a 6, which has the effect of restoring all prior restrictions to calling. Presently, the digits 7, 8, 9, * and # are not used to initiate a program in sequence. These digits are left available for future programming sequences, if desired.

As will be clear from the following description, the entire programming process will never result in sufficient numbers being dialed that the telephone company thinks that an improper attempt has been made to place a call. For example, the security code is only four digits. After entering the security code, the connection between the central office line and the local telephone is broken so this is seen as the local telephone being hung up. Of course, the dialing control circuit has been placed in the programming sequence such that it is aware that the security code has been entered and will enter the proper mode upon being reconnected to the central office phone line. Similarly, all other programming steps result in a disconnect occurring prior to sufficient digits being entered that a phone number may be inadvertently dialed. Even when entering a new phone number into the memory, the user is required to continue to enter the new digits at a regular rate, waiting no more than four seconds between digits in order to complete the programing process. In addition, as soon as the new phone number has been entered, it is properly stored in memory and the local telephone line is disconnected from the central office line to ensure that a telephone number is not improperly dialed. The detail description for placement of a toll telephone call or programming of the circuit is as follows.

The device determines whether the first digit is a 0 or 1, as shown by block 74. If the first digit is a 0 or 1, the user is dialing a long-distance or operator-assisted call, and the device is placed in wait mode, block 76, until a digit becomes ready. The device then accepts subsequent numbers so that a long distance telephone call can be made. The user is permitted to make an unrestricted long distance call as desired. The call is connected through the central office system and the user is connected to the telephone number which he has dialed. If, upon completion of a security override toll call, a user wishing to place another toll call presses the # key the device disconnects and reconnects the phone. This allows another toll call to be made without first entering the security code again. At the conclusion of the telephone call, the user has the option to place additional toll calls without being required to hang up and enter the security code again. As shown in block 78, if the user presses a # key, at any time during the dialing sequence or after the phone call has been completed, the program outputs a success tone 93, gives a short disconnect time period 70 and resets the system to permit the user to make additional toll calls or to program the device.

If the first number is not a 0 or 1 as determined in block 74, the device determines whether the number is a 2, as shown by block 80. If a 2 has been entered, the device clears all phone numbers from the memory, as shown by block 81, erasing all allowed phone numbers.

If the number is not a 2, the device determines if the number is a 3, as shown by block 82. If the number is a 3, a program segment enabling the entry of a new allowed phone number is begun. The device performs a temporary disconnect, as shown by block 83, and a four-second timer is begun, as shown by block 84. The device then is in wait mode until a digit is ready, as shown by block 85. If the digit is entered within four seconds, block 86, and the digit is not a #, block 87, the number is stored temporarily, as shown by block 88. The entry of digits continues until ten digits are stored or the # key is pressed, at which time the device searches the memory to determine if the number entered was already an allowed phone number, as shown by block 90. If the number matches an allowed phone number in memory, the programming segment is complete, as shown by block 91. If the number has not yet been programmed as an allowed number, the device polls the memory 21 to determine if it is full, as shown by block 91A. If the memory is not full, the device stores the number to memory as an allowed phone number, as shown by block 92. Regardless of whether or not the newly entered allowed phone number had been stored previously, upon completion of the program segment, the newly entered number will be present in memory. Thus, a success tone will be generated. If in block 91A the memory is full, the number is not stored to memory and the device generates an error tone indicating unsuccessful entry of a number.

If in block 82 the number was not a 3, the device determines whether the number is a 4, as shown by block 94. If a 4 has been entered, a new code number can be entered. The device performs a temporary disconnect, as shown by block 96, begins a four second timer, as shown by block 98, and is placed in wait mode until a digit is ready, as shown by block 100. If a number is entered within the allowed four second period, block 102, the device temporarily stores the number, as shown by block 104. The device then determines if the digit is the fourth digit entered in this sequence, block 106, and, if it is not, the device returns to the step of block 98, where the four second timer is reset and the device is placed in wait mode for another digit. If the device determines that the fourth digit has been entered, the four digits which have been stored temporarily are stored as the new security code of the device, as shown by block 108.

If the number determined in block 94 is not a 4, the device determines if the number is a 5, as shown by block 110. If the number is a 5, all phone call restrictions are discontinued, block 112, until the phone is hung up or a 6 is entered during a subsequent programming procedure.

If the number in block 110 is not a 5, the device determines if the number is a 6, as shown by block 114. If the number is a 6, the device restores all of the restrictions, as shown by block 116.

If the digit is not a 6, the programming as contemplated in the preferred embodiment of the device determines that a number has been entered in error, and restarts the programming sequence. Upon completion of the programming sequences begun when a number between 2 and 6 has been entered, the device generates a success tone as shown by block 93, and returns to the beginning of the programming mode sequence, where a disconnect is entered and subsequent programming sequences or dialing of a toll call can be entered.

The device may be adapted easily to allow other programming options to be developed utilizing the 7, 8, 9, or * keys.

An alternative embodiment of the inventive device utilizes a program sequence initiated by the dialing of a 9. In this alternative embodiment, entry of a programming digit 9 permits entry of sequences of indeterminate length. This prevents disruption of phone calls using touch tone responses to prompts, such as bank account access lines and transfer sequences.

Installation of the apparatus straightforward. To install the inventive device in a facility, the existing telephone outlet is first removed and disconnected from the two-wire input central office telephone line. The central office telephone input line is then connected electrically to terminals 18 and 18A as described previously. The package is then installed by mounting the apparatus in the location formerly occupied by the previous wall plate and installing standard mounting screws through apertures 11 and 12. A telephone can then be connected to the device by inserting a standard telephone line connector into the output jack 3. To the outside observer, even if an expert, the jack and faceplate appear to be common, commercially available standard devices and the observer will not know that the dialing of phone calls is being controlled.

Figure 6:
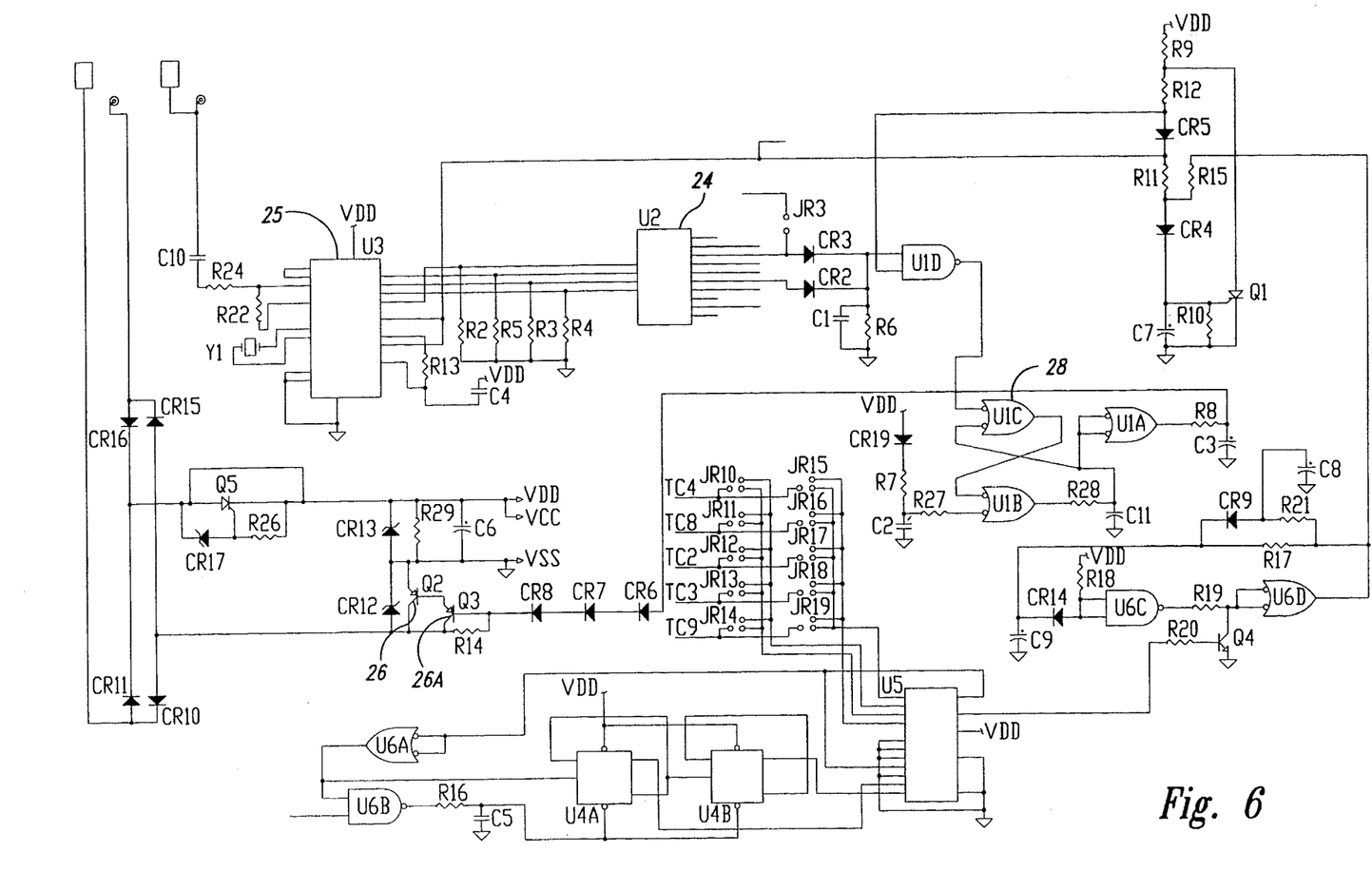
FIG. 6 is a circuit schematic of an alternative embodiment of the invention.

FIG. 6 is a circuit schematic of an alternative embodiment of the inventive device. The device of FIG. 6 differs from the device of FIG. 3 because the device of FIG. 6 incorporates a hard-wired security code sequence. The sequence can be selected in the manufacturing process by making connections between various terminals of jumpers JR10 through JR19 and thereby selecting the inputs X0 through X3 of selector device 23 into which BCD outputs Q1, Q3, Q4, Q6 and Q8 of DTMF decoder 24 are transmitted. The device of FIG. 6 also does not use the microprocessor, memory and programming capabilities of the device of FIG. 3. Thus, it cannot be programmed and will not permit pulsed calls.

As with the preferred embodiment of the device, in this alternative embodiment, lifting of the receiver on the telephone draws current through the device, giving it the power to operate. Also in series with the phone line is the device's power control transistor. When the device first powers up, the DTMF decoder chip 25 is monitoring the line to decode any digit which is dialed. If the first digit dialed is a 1 or a 0, then the decoded 1 or 0 is routed to a latch 28, which is set high. This high logic level reduces the drive current for the power control transistor pair 26, 26A until the point is reached where any less drive current to the transistor will reduce the logic high and stop the further reduction of current to the power control transistor. The device remains in this half off, half on state until the power is removed completely by hanging up the telephone in series with it. While in the half off, half on state, the current allowed through the device is insufficient to allow most phones to work, thus preventing the call from continuing. Once the telephone is on the hook, the telephone company central office will abort the call. If the telephone is then picked up again, the telephone company central office will consider this a new call.

If the first digit of the hard wired override code is entered, then a decode circuit is advanced to the next stage to watch for the next digit. When the next DTMF digit is dialed, it is compared to the next digit of the override code. If a match exists, then the circuit is advanced to watch for the next digit. If at any point in the decode the next DTMF dialed digit does not match the next digit of the hard wired override code, then the decoder circuit will reset to begin looking for the first digit of the override code. If all four digits of the override code are entered in the proper order, then the success of the final digit being decoded will result in an override memory being set. When this memory is set, then the circuit which monitors for a first digit of 1 or 0 is set to a condition such that it treats the first digit like a second digit, there being no restriction on the second digit being 1 or 0, and therefore a toll call is allowed. The override memory is formed with a capacitor and a voltage sampler. When the phone is hung up causing a discontinuance of current through the device, this memory will discharge within a few seconds after which the override condition is lost until the override code is again entered.

Figure 7:
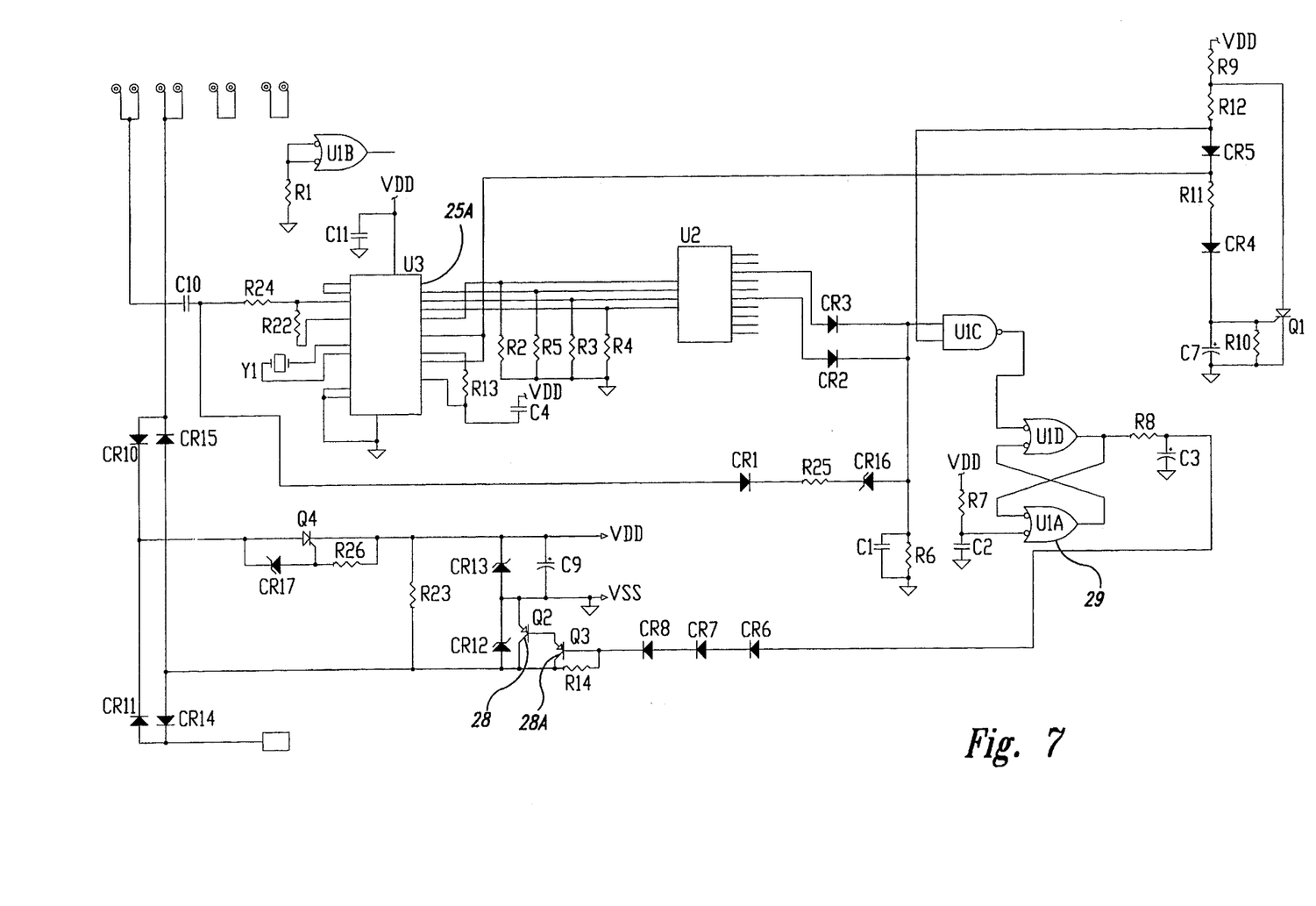
FIG. 7 is a circuit schematic of an alternative embodiment of the invention.

FIG. 7 is a circuit schematic of an alternative embodiment of a device for restricting telephone call dialing and access. The circuit of FIG. 7 differs from the device of FIG. 6 because the device of FIG. 7 excludes the option of overriding the restrictor by entering a security code. The device restricts all toll calls by disconnecting the telephone upon the entry of a telephone number beginning with either a 1 or a 0.

As with the preferred embodiment of the device, in this alternative embodiment lifting of the receiver on the telephone draws current through the device, giving it the power to operate. Also in series with the phone line is the device power control transistor pair 28, 28A. When the device first powers up, the DTMF decoder chips monitor the line to decode any digit which is dialed. If the first digit dialed is a 1 or a 0, then the decoded 1 or 0 is routed to a latch 29, which is set high. This high logic level reduces the drive current for the power control transistor until the point is reached where any less drive current to the transistor will reduce the logic high and stop the further reduction of current to the power control transistor. The device remains in this half off, half on state until the power is removed completely by hanging up the telephone in series with it. While in the half off, half on state, the current allowed through the device, though very measurable, is insufficient to allow most phones to work, thus preventing the call from continuing. Once the telephone is on the hook, the telephone company central office will abort the call. If the telephone is then picked up again, the telephone company central office will consider this a new call.

An alternative embodiment of the device includes a circuit to allow the microprocessor to distinguish an interruption of current by central office equipment from a dialing pulse generated by the controlled telephone. This prevents the microprocessor from mistakenly interpreting central office equipment switching as a user input.

In certain telephone central office equipment, the central office equipment intermittently interrupts the current flow to an off-hook telephone for a brief period, usually around 250 milliseconds. Such interruptions may occur while the central office equipment is changing modes, such as when dial tone is about to be supplied, or a dialed number has been accepted and a call connection is about to be established. Because the dialing controller is generally in a series circuit with the central office telephone line and the controlled telephone, current is the same throughout the circuit. Consequently, an interruption by the central office and an interruption by the controlled telephone each appear as a current interruption throughout the circuit. Therefore, interruption of current by the central office can appear to a series dialing controller to be the same as a dialing pulse, resulting in improper operation of the dialing controller.

In the alternative embodiment described above, the telephone controller distinguishes between interruption sources to eliminate this problem. A detection circuit monitors the voltage across the telephone input terminals connected to the dialing controller. This voltage is compared to a selected voltage, and if the voltage is larger than the selected value, the microprocessor identifies the current interruption as resulting from a break in the series circuit caused by the controlled telephone. When the voltage is smaller than the selected value, the microprocessor identifies the interruption of current as originating at the central office. Since the voltage across the controlled telephone will be too large for the microprocessor to monitor directly and the voltage may be either positive or negative relative to the microprocessor ground, this voltage must be converted to a lower voltage of a fixed polarity.

Circuits to perform this function are well known in the art. One implementation of such a device incorporates a resistor and a triac connected across the controlled telephone line as a voltage monitor. The output of the voltage monitor is then transmitted to the microprocessor as an input which the microprocessor accommodates in its programming.

We claim:

1. A device for controlling telephone dialing access, the device having a pair of central office telephone line input terminals for connection to a telephone line from a central office and a pair of telephone line output terminals connected to the central office telephone line input terminals via a telephone dialing control circuit, the circuit comprising:

a diode bridge circuit having a first input connected to a first one of the telephone line output terminals and a second input connected to a first one of the central office line input terminals;

a power disconnect circuit electrically connected to the diode bridge, all power for circuits within the device being provided via the power disconnect circuit when the power disconnect circuit is actuated to a first state and no power being provided via the power disconnect circuit when the power disconnect circuit is actuated to a second state;

a voltage protection zener diode connected electrically between the power control disconnect circuit and package ground;

a DTMF decoder integrated circuit chip electrically connected to a second one of the telephone line output terminals and a second one of the central office line input terminals for receiving tones output by a local telephone as a number is dialed, the DTMF decoder chip receiving its power via the power disconnect control circuit;

a microprocessor integrated circuit chip receiving decoded inputs from the DTMF decoder chip so that numbers dialed can be used to input program steps or data in the microprocessor, the microprocessor receiving its power via the power disconnect circuit, an output from the microprocessor being electrically connected to the power disconnect circuit to actuate the power disconnect circuit to the first or second states;

a standby power circuit connected to maintain power to the microprocessor when the power disconnect circuit is actuated to the second state;

a disconnect timer circuit electrically connected to the power disconnect circuit and to an input of the microprocessor and inputting a signal to the microprocessor at a selected time after the microprocessor has sent a signal output to stop power from being supplied by the power disconnect circuit to itself and other integrated circuits on the chip so that the microprocessor automatically outputs a signal to the power disconnect circuit to resupply power to itself and other integrated circuits on the chip through the power disconnect circuit a selected time after the microprocessor outputs a signal to disconnect power to itself and other integrated circuits on the chip, the selected time being adequate to indicate to the central office the local telephone is not connected to the telephone line from the central office, the resupply power signal being sent prior to all power being completely removed from the microprocessor such that the microprocessor maintains the input program steps as data during the time power from the power disconnect circuit is disconnected from the microprocessor; and a phone number memory chip electrically connected to the microprocessor and storing telephone numbers or data under the control of the microprocessor.

2. The device according to claim 1, further including a telephone isolation circuit electrically connected to the circuit, the telephone isolation circuit preventing connection of an attached telephone to the telephone line upon detection of a line voltage reduced from a nominal operating voltage.

3. The device of claim 1 wherein the microprocessor further responds to dial pulses received at the central office telephone line input terminals to determine numbers dialed.

4. The device according to claim 4 wherein said power disconnect circuit includes a first power output supply voltage and a second power output supply voltage, the first power output supply voltage providing power to the DTMF chip and an input signal to the microprocessor and to the disconnect timer circuit, the second power supply output providing a power supply to the microprocessor during the time power from the power disconnect circuit is disconnected from the microprocessor.

5. The device according to claim 4 wherein said power disconnect circuit further includes:

a bleed resistor and capacitor circuit connected to the first power supply output; and a storage capacitor circuit connected to the second power supply output, the bleed resistor and capacitor circuit reducing the voltage provided by the first voltage supply significantly faster than the voltage is reduced that is provided by the second power supply.

6. The device of claim 1 wherein all circuit components are attached to a single printed circuit board and the circuit board is mounted on a faceplate having a front surface configured like a standard telephone faceplate.

7. The device of claim 1 wherein the phone number memory is an erasable programmable read only memory integrated circuit device.

8. The device of claim 7 wherein the microprocessor circuit includes an enabling routine enabling the user to enter or erase numbers in the phone number memory device only after entry of a plurality of numbers in a predetermined sequence corresponding to a code sequence stored in a memory.

9. The device of claim 1 wherein the device is operable using only power available from the central office telephone line.

10. The device of claim 1 wherein the power disconnect circuit in the first state provides a first output voltage and the standby power circuit provides a second output voltage to the microprocessor, said power disconnect circuit further includes a bleed resistor and capacitor circuit connected to reduce the first output voltage when the power disconnect circuit is actuated to the second state and the standby power circuit includes a storage capacitor circuit connected to maintain the second voltage for a selected time period sufficient, the bleed resistor and capacitor circuit reducing the voltage provided by the power disconnect circuit below an operating voltage of the DTMF chip within the selected time period.

11. The device of claim 1 wherein the microprocessor is programmed to send the signal output to stop power from being supplied at a plurality of programming intervals during a programming sequence.

12. A device for controlling telephone dialing access, comprising:

a pair of central office telephone line input terminals for connection to a central office telephone line and a pair of telephone line output terminals connected to the central office telephone line input terminals via a telephone interrupt circuit, said telephone interrupt circuit being controlled by a disconnect timer circuit connected to a microprocessor, the microprocessor being connected to a phone number memory, said disconnect timer circuit connected to activate the telephone interrupt circuit for a selected time period during a programming sequence of the microprocessor or of the phone number memory, said telephone interrupt circuit preventing electrical signals received at the central office telephone line input terminals from being transmitted through the device to a telephone connected to the telephone line output terminals during said selected time period of activation and said disconnect timer circuit deactivating said telephone interrupt circuit after the selected time period has expired, allowing electrical signals received at the central office telephone line input terminals to be transmitted through the device to the telephone line output terminals without interrupting power to the microprocessor during the selected time period to maintain a current position in the programming sequence.

13. The device according to claim 12 wherein immediately after the selected time period, the telephone interrupt circuit permits signals received at the central office telephone line input terminals to reach a telephone attached to the telephone line output terminals in the absence of a subsequent activation of the telephone interrupt circuit by the disconnect timer circuit.

14. The method of programming a dialing control circuit comprising:

decoding a DTMF signal entered from a local telephone;

determining if the number entered matches the selected security code, said security code having fewer digits than that required to complete a phone call through the central office telephone line;

disconnecting the local telephone from the central office telephone line after the security code has been properly entered and recognized;

automatically reconnecting the local telephone line to the central office phone line at a selected time after the disconnection between the local telephone and the central office phone line has occurred, the selected time being sufficiently long that the central office system registers that the local telephone has been completely disconnected and hung up, the reconnection of the local telephone to the central office telephone lines resulting in a new dial tone being obtained;

permitting the dialing of a toll call after the dial tone has been re-obtained following the disconnection after the security code was entered;

permitting, alternatively, the programming of the dialing control circuit by entering programming digits into the local telephone, each permissible programming sequence being selected to ensure that a disconnection between the local telephone and the central office telephone lines occurs on a regular basis and in each event prior to the central office system recognizing the numbers input as being a potential number and attempting to connect the local telephone to a number which is perceived to have been dialed;

upon entry from the local telephone of an end of step signal, disconnecting the local telephone from the central office telephone line; and automatically reconnecting the local telephone line to the central office phone line at a second selected time after the disconnection between the local telephone and the central office phone line has occurred, the second selected time being sufficiently long that the central office system registers that the local telephone has been completely disconnected and hung up, the reconnection of the local telephone to the central office telephone lines resulting in a new dial tone being obtained.

15. The method of claim 14 wherein the step of programming the dialing control circuit includes entering allowable numbers into a memory within the central circuit.

16. A device for controlling telephone dialing access comprising:

a telephone dialing sensor and central office control circuit connected to a telephone line, including a telephone isolation circuit, said telephone dialing sensor and control circuit able to detect telephone numbers dialed from an attached telephone connected to said telephone dialing sensor and control circuit and to restrict dialing access from the attached telephone, said telephone isolation circuit preventing the connection of the attached telephone to the telephone line if a line voltage reduced from a nominal operating line voltage is present on the telephone line prior to an attempted connection of the attached telephone to the telephone line, wherein the telephone dialing sensor further includes a microprocessor programmable from the attached telephone; and a telephone interrupt circuit having a disconnect timer having a selected disconnect time period, the interrupt circuit being connected to temporarily electrically disconnect the attached telephone from the telephone line for the selected disconnect time period under control of the disconnect timer at a plurality of times during a programming sequence of the microprocessor.

17. The device of claim 16 further including a standby power circuit connected to provide power to the microprocessor during the time the attached telephone is temporarily disconnected from the telephone line to maintain a current position in the programming sequence when the attached telephone is disconnected from the telephone line.

* * * * *